J. L. HECHT.
TRACTION WHEEL.
APPLICATION FILED DEC. 20, 1915.
1,312,176.
Patented Aug. 5, 1919.
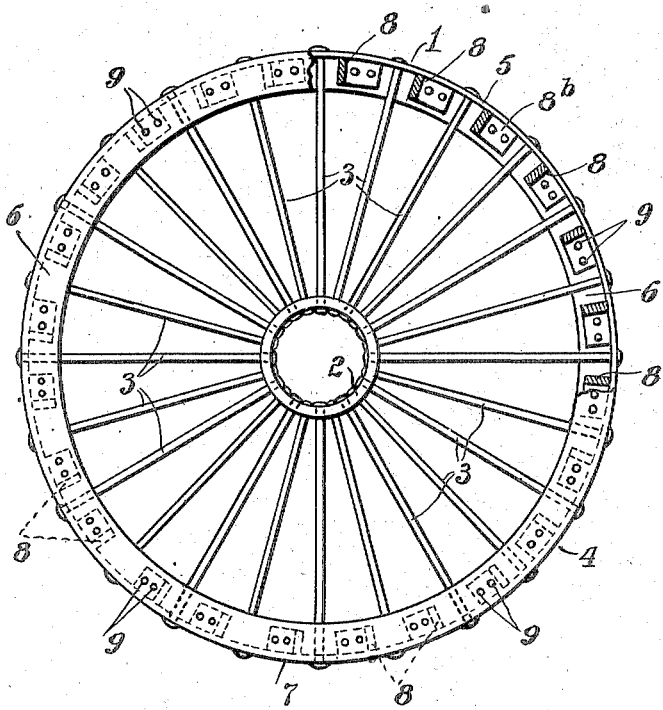
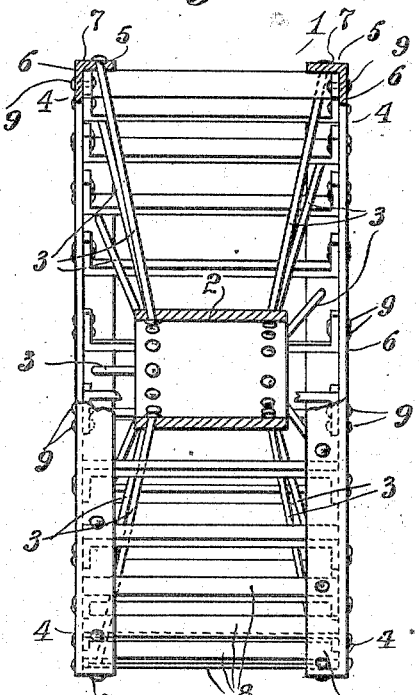
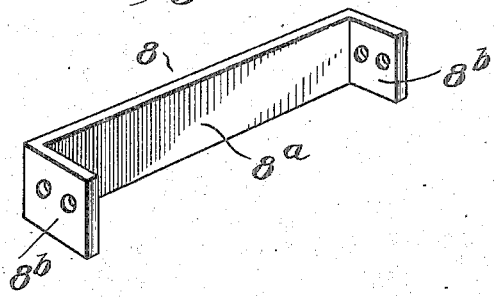
Attest:
Inventor:
J. L. Hecht
by Rogers, Kennedy & Campbell
Attys

UNITED STATES PATENT OFFICE.

JOSEPH L. HECHT, OF DAVENPORT, IOWA, ASSIGNOR TO G. WATSON FRENCH, NATHANIEL FRENCH, JOSEPH L. HECHT, AND W. H. STACKHOUSE, ALL OF DAVENPORT, IOWA, COMPOSING THE FIRM OF FRENCH & HECHT, OF DAVENPORT, IOWA.

TRACTION-WHEEL.

1,312,176.      Specification of Letters Patent.      Patented Aug. 5, 1919.

Application filed December 20, 1915. Serial No. 67,747.

*To all whom it may concern:*

Be it known that I, JOSEPH L. HECHT, a citizen of the United States, residing at Davenport, in the county of Scott and State of Iowa, have invented certain new and useful Improvements in Traction-Wheels, of which the following is a specification, reference being had therein to the accompanying drawing.

This invention relates to traction wheels designed more particularly for use in connection with tractors adapted to work on soft ground as on farms, the object of the invention being to produce a wheel which will engage the soft ground in such manner as to furnish the necessary tractive power, and at the same time will be adapted to travel over hard surfaces, such as country roads, without cutting the roads up or injuring the same.

With these ends in view my invention consists in an improved construction of wheel, wherein flat tread surfaces are provided for traveling on the hard ground, and traction members are provided for furnishing the necessary tractive power in soft ground, the traction members being so disposed relatively to the tread surfaces that they will extend inward of or flush with said surfaces.

In embodying the above described characteristics in a wheel in accordance with my invention, the rim of the wheel is composed of two annular end members each provided preferably with flanges angularly related to each other, the said members being so disposed that one of the flanges on each will extend axially or substantially so of the wheel so as to form flat tread surfaces, and the other flanges will extend inwardly toward the center of the wheel, a series of traction members being arranged between the end members and firmly secured thereto in such relations that the outer active edges of the traction members will not project beyond the tread surfaces but will be disposed inward of or flush therewith.

As a result of this construction a wheel is formed which in use on soft ground will sink therein sufficiently to enable the traction members to engage with the necessary tractive effect, but on harder ground surfaces the broad tread surfaces will prevent the sinking of the wheel and consequently the traction members will be maintained out of injurious contact therewith.

In the accompanying drawings:

Figure 1 is a side elevation of my improved wheel partly in section.

Fig. 2 is a view of the same partly in longitudinal section, and partly in end elevation.

Fig. 3 is a perspective view of one of the traction members.

Referring to the drawings:

My improved wheel comprises a rim 1, hub 2, and spokes 3 connecting said parts.

The rim is in the form of two end members 4 each constructed from a section of angle iron bent into annular form and each provided with a horizontal flange 5 and a vertical flange 6. These end members are in the present instance disposed with the horizontal flanges extending inwardly toward each other from the vertical flanges, the horizontal flanges being thus disposed at the perimeter of the wheel and constituting broad flat tread surfaces 7, the spokes 3 being connected at their outer ends to said horizontal flanges and at their inner ends to the hub. Extending between the flanged end members at appropriate intervals therearound, are a series of traction members 8 consisting each as shown in Fig. 3 preferably of a flat plate $8^a$, the opposite ends of which are bent laterally to form feet $8^b$. These plates are arranged between the end members so that they will stand edgewise to the tread surfaces, the feet on the plates being seated against and firmly secured to the inner sides of the respective vertical flanges 6, as by the rivets 9, with the outer edges of the plates adjacent the feet, bearing against the inner faces of the horizontal flanges.

The wheel thus formed presents two flat tread surfaces, and a series of intermediate relatively narrow traction members, the tread surfaces being so proportioned that while they will travel on hard surfaces such as roads without injury thereto, they will however sink sufficiently in soft ground to permit the traction plates to engage with the proper tractive power, and by reason of the fact that the outer effective edges of the traction members do not extend beyond the tread surfaces, there will be no danger, in traveling over hard ground, of injury thereto by the contact of the traction members therewith.

In the accompanying drawings and foregoing description I have set forth my invention in the particular detailed form which I prefer to adopt, but it is manifest that such changes may be made in the different parts as would suggest themselves to the skilled mechanic, without departing from the limits of my invention. For instance the flanges on the end members need not be arranged exactly at right angles to each other, and the traction members need not necessarily be of the exact form shown, the important feature being a wheel rim made up of the two separate end members and presenting flat tread surfaces, and connected together by traction members so disposed that the outer active edges of the same will not project beyond the tread surfaces. Therefore it will be understood that my invention is not to be limited to any particular form or construction of the parts except in so far as such limitations are set forth in the claims.

Having thus described my invention, what I claim is:

1. In a traction wheel, the combination of two spaced annular end members constituting the rim of the wheel and formed each with a horizontal flange and with a connected vertical flange, the said members being disposed with the horizontal flanges extending inwardly toward each other at the perimeter of the wheel to form flat tread surfaces, and with the vertical flanges on the outside, and a series of traction members consisting each of a flat plate with lateral feet at its ends, said plates being disposed edgewise to the tread surfaces with the feet thereof connected to the vertical flanges.

2. In a traction wheel, the combination of two spaced annular end members constituting the rim of the wheel and formed each with a horizontal flange and with a connected vertical flange, said members being disposed with the horizontal flanges extending inwardly toward each other at the perimeter of the wheel to form flat tread surfaces, and a series of traction members consisting each of a flat plate with lateral feet at its ends, said plates being disposed edgewise to the tread surfaces with the feet thereon connected to the vertical flanges, and with the outer edges of the plates adjacent the feet bearing against the inner faces of the horizontal flanges.

In testimony whereof, I have affixed my signature.

JOSEPH L. HECHT.